: (12) United States Patent
Palanki et al.

(10) Patent No.: US 8,401,033 B2
(45) Date of Patent: Mar. 19, 2013

(54) SYSTEMS, APPARATUS AND METHODS TO FACILITATE PHYSICAL CELL IDENTIFIER COLLISION DETECTION

(75) Inventors: Ravi Palanki, San Diego, CA (US);
Naga Bhushan, San Diego, CA (US);
Aamod D. Khandekar, San Diego, CA (US); Ashwin Sampath, Skillman, NJ (US); Raja S. Bachu, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 12/722,290

(22) Filed: Mar. 11, 2010

(65) Prior Publication Data

US 2010/0234016 A1 Sep. 16, 2010

Related U.S. Application Data

(60) Provisional application No. 61/160,214, filed on Mar. 13, 2009.

(51) Int. Cl.
*H04L 12/43* (2006.01)
*H04W 24/00* (2009.01)

(52) U.S. Cl. ........................................ 370/448; 455/424

(58) Field of Classification Search .................. 455/424, 455/343, 450, 422.1, 436, 522, 92; 370/329, 370/335, 342, 349, 445, 328, 330, 331, 333, 370/334, 336, 337, 338, 347, 441, 462, 243, 370/461, 443, 448, 447, 389, 375.4
See application file for complete search history.

(56) References Cited

U.S. PATENT DOCUMENTS

| 6,859,445 | B1 * | 2/2005 | Moon et al. | 370/335 |
|---|---|---|---|---|
| 7,079,507 | B2 * | 7/2006 | Toskala et al. | 370/329 |
| 2006/0227852 | A1 * | 10/2006 | Black et al. | 375/133 |
| 2007/0211751 | A1 * | 9/2007 | Yoshikawa | 370/447 |
| 2008/0207207 | A1 | 8/2008 | Moe et al. | |
| 2010/0172311 | A1 | 7/2010 | Agrawal et al. | |

FOREIGN PATENT DOCUMENTS

WO WO0243430 5/2002

OTHER PUBLICATIONS

Ericsson: "Automatic neighbour cell configuration" 3GPP Draft; S5-071484, 3rd Generation Partnership Project (3GPP), Mobile Competence Centre; Sophia-Antipolis Cedex ; France, (Aug. 2007), XP050306143, paragraph 3.4.
Huawei: "Detection of conflicting cell identities" 3GPP Draft; R3-071947, 3rd Generation Partnership Project (3GPP), Mobile Competence Centre; Sophia-Antipolis Cedex ; France , XP050162733 [retrieved on Oct. 3, 2007] the whole document, (Oct. 3, 2007).
International Search Report and Written Opinion—PCT/US2010/027236—ISA/EPO—Jun. 16, 2010.
QUALCOMM Europe: "UE-assisted heuristic detection of PCI collision", Sep. 23, 2008, 3GPP Draft; R2-085380 UE Assisted Heuristic Collision Detection, 3rd Generation Partnership Project (3GPP), Mobile Competence Centre; 650, Route Des Lucioles; F-06921 Sophia-Antipolis Cedex; France, XP050320229, [retrieved on Sep. 23, 2008].

* cited by examiner

*Primary Examiner* — Melody Mehrpour

(57) ABSTRACT

Systems, apparatus, methods and computer program products for facilitating collision detection are provided. In some embodiments, a method can include: receiving identifying information during one or more time intervals from a plurality of base stations; determining whether at least two different values of the identifying information from the plurality of base stations have been transmitted during the same time interval; and determining that a collision has occurred between at least two of the plurality of base stations in response to determining that the at least two different values of the identifying information from the plurality of base stations have been transmitted during the same time interval.

64 Claims, 12 Drawing Sheets

SYSTEMS, APPARATUS AND METHODS TO FACILITATE PHYSICAL CELL IDENTIFIER COLLISION DETECTION

CROSS-REFERENCE TO RELATED APPLICATIONS

This application claims the benefit of U.S. Provisional Patent Application Ser. No. 61/160,214 titled "Method and Apparatus to Enable Physical Cell Identifier (PCI) Collision Detection in Synchronous Networks," which was filed Mar. 13, 2009, and the entire contents of which are incorporated herein by reference.

BACKGROUND

I. Field

The following description relates to wireless communications, in general, and to physical cell identifier (PCI) collision detection in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs. In unplanned and self organizing networks (SONs), there is a good probability that a given area is covered by more than one cell with the same physical cell identifier (PCI), which will be referred to as a "collision" herein. Collisions can result in ambiguous operation, for example during handover. One method of improving the likelihood of collision-free operation is to configure UEs to report collisions. Collision reporting by UEs can be facilitated if UEs have collision detection capability. This can be achieved to some extent in asynchronous networks, where the neighbor cell search detects both of the cells of interest at different time offsets. However, such methods may not work in synchronous networks because the Single Frequency Network (SFN) nature of the signals involved during cell search can result in the two colliding cells appearing as one cell to the UE. Accordingly, systems, apparatus and methods for enabling PCI collision detection in synchronous networks are desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with network listening to facilitate collision detection in wireless communication systems.

According to related aspects, a method is provided. The method can facilitate collision detection in a wireless communication system. The method can include: receiving identifying information during one or more time intervals from a plurality of BSs; determining whether at least two different values of the identifying information from the plurality of BSs have been transmitted during the same time interval; and determining that a collision has occurred between at least two of the plurality of BSs in response to determining that the at least two different values of the identifying information from the plurality of BSs have been transmitted during the same time interval.

According to another aspect, a computer program product is provided. The computer program product can include a computer-readable medium. The computer-readable medium can include: a first set of codes for causing a computer to receive identifying information during one or more time intervals from a plurality of BSs; a second set of codes for causing the computer to determine whether at least two different values of the identifying information from the plurality of BSs have been transmitted during the same time interval; and a third set of codes for causing the computer to determine that a collision has occurred between at least two of the plurality of BSs in response to determining that the at least two different values of the identifying information from the plurality of BSs have been transmitted during the same time interval.

According to another aspect, an apparatus is provided. The apparatus can include: means for receiving identifying information during one or more time intervals from a plurality of BSs; means for determining whether at least two different values of the identifying information from the plurality of BSs have been transmitted during the same time interval; and means for determining that a collision has occurred between at least two of the plurality of BSs in response to determining that the at least two different values of the identifying information from the plurality of BSs have been transmitted during the same time interval.

According to another aspect, an apparatus is provided. The apparatus can include a collision detection module. The collision detection module can be configured to: receive identifying information during one or more time intervals from a plurality of BSs; determine whether at least two different values of the identifying information from the plurality of BSs have been transmitted during the same time interval; and determine that a collision has occurred between at least two of the plurality of BSs in response to determining that the at least two different values of the identifying information from the plurality of BSs have been transmitted during the same time interval.

According to related aspects, another method is provided. The method can include: transmitting first identifying information to a UE during one or more time intervals, wherein the first identifying information is indicative of a value for a cell managed by a first BS, and wherein the value for a cell managed by a first BS and at least one of the one or more time intervals is employed to determine whether a collision has occurred between the first BS and a second BS transmitting second identifying information.

According to another aspect, another computer program product is provided. The computer program product can include a computer-readable medium. The computer-readable medium can include: a first set of codes for causing a computer to transmit first identifying information to a UE during one or more time intervals, wherein the first identifying information is indicative of a value for a cell managed by a first BS, and wherein the value for a cell managed by a first BS and at least one of the one or more time intervals is employed to determine whether a collision has occurred between the first BS and a second BS transmitting second identifying information.

According to another aspect, another apparatus is provided. The apparatus can include: means for transmitting first identifying information to a UE during one or more time intervals, wherein the first identifying information is indicative of a value for a cell managed by a first BS, and wherein the value for a cell managed by a first BS and at least one of the one or more time intervals is employed to determine whether a collision has occurred between the first BS and a second BS transmitting second identifying information.

According to another aspect, another apparatus is provided. The apparatus can include a physical cell identification module. The physical cell identification module can be configured to: transmit first identifying information to a UE during one or more time intervals, wherein the first identifying information is indicative of a value for a cell managed by a first BS, and wherein the value for a cell managed by a first BS and at least one of the one or more time intervals is employed to determine whether a collision has occurred between the first BS and a second BS transmitting second identifying information.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
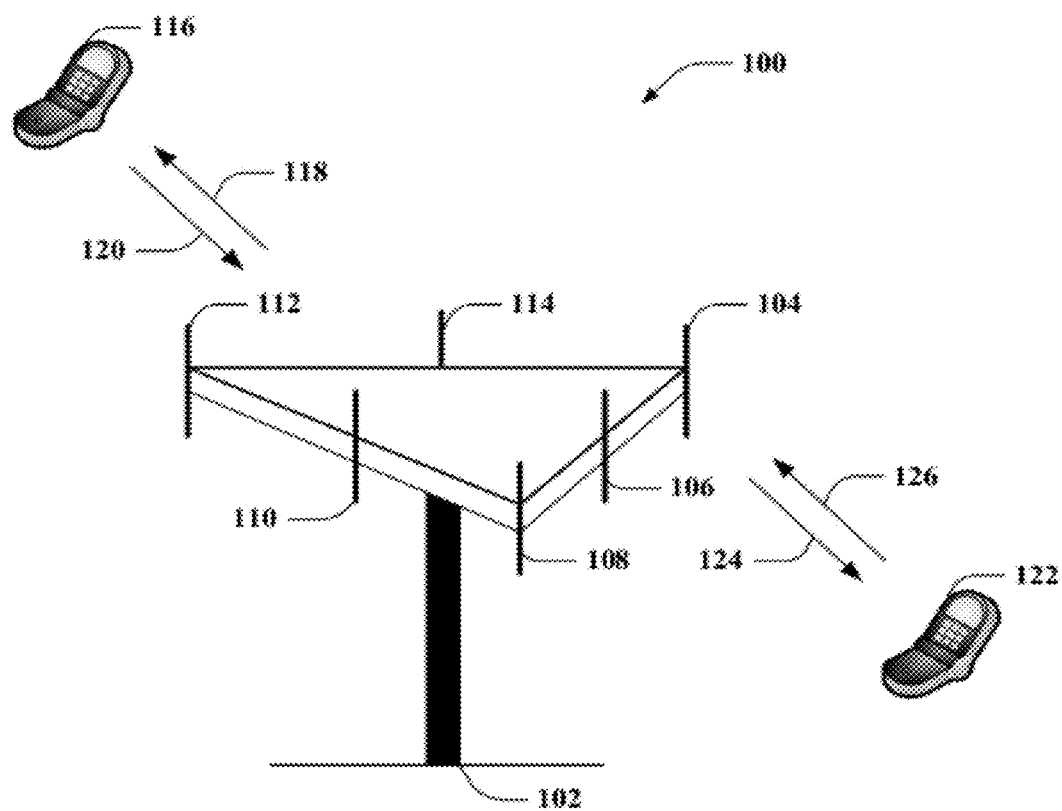
FIG. 1 is an illustration of an example wireless communication system enabling physical cell identifier (PCI) collision detection in synchronous networks in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between one or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers interim standard 8020 (IS-8020), interim standard 95 (IS-95) and interim standard 856 (IS-856). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the UL. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless local area network (wireless LAN), BLUETOOTH and any other short- or long-range, wireless communication techniques.

SC-FDMA utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., erasable programmable read only memory (EPROM), card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system enabling physical cell identifier (PCI) collision detection in synchronous networks in accordance with various aspects set forth herein.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, personal digital assistants (PDAs), and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs.

Figure 2:
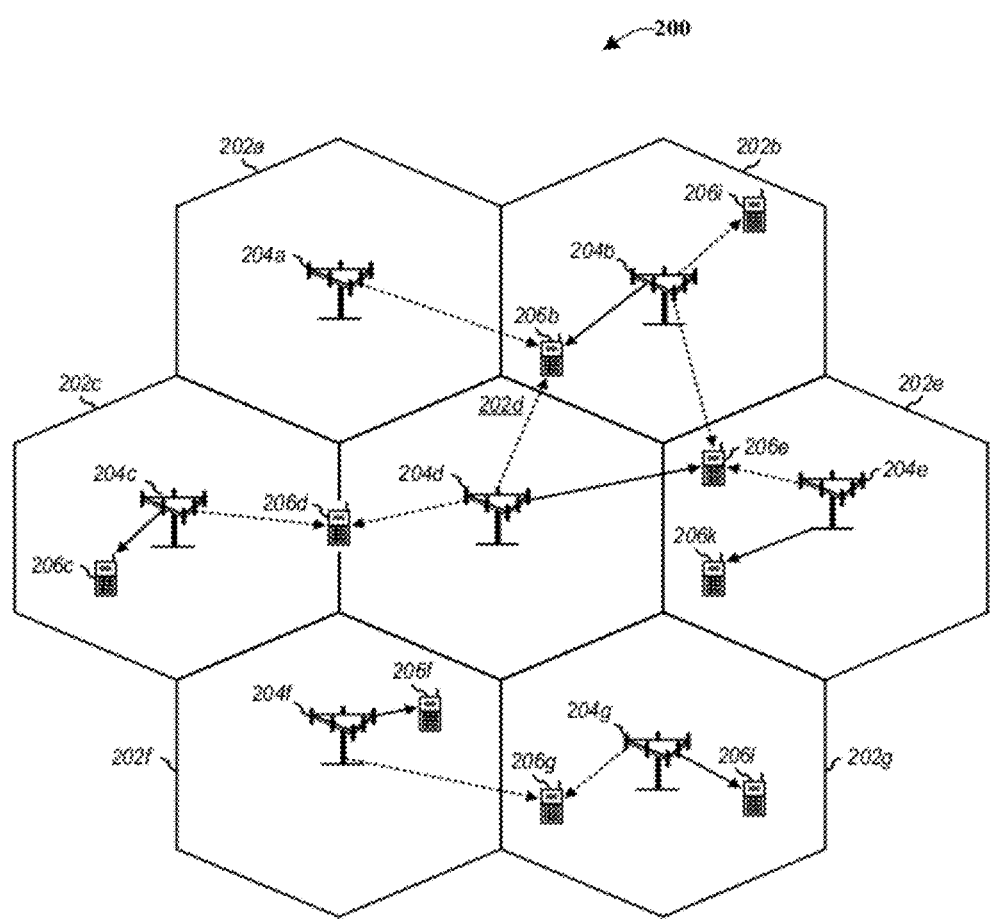
FIG. 2 is an illustration of another example wireless communication system enabling PCI collision detection in synchronous networks in accordance with various aspects set forth herein.

FIG. 2 is an illustration of another example wireless communication system enabling PCI collision detection in synchronous networks in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 3:
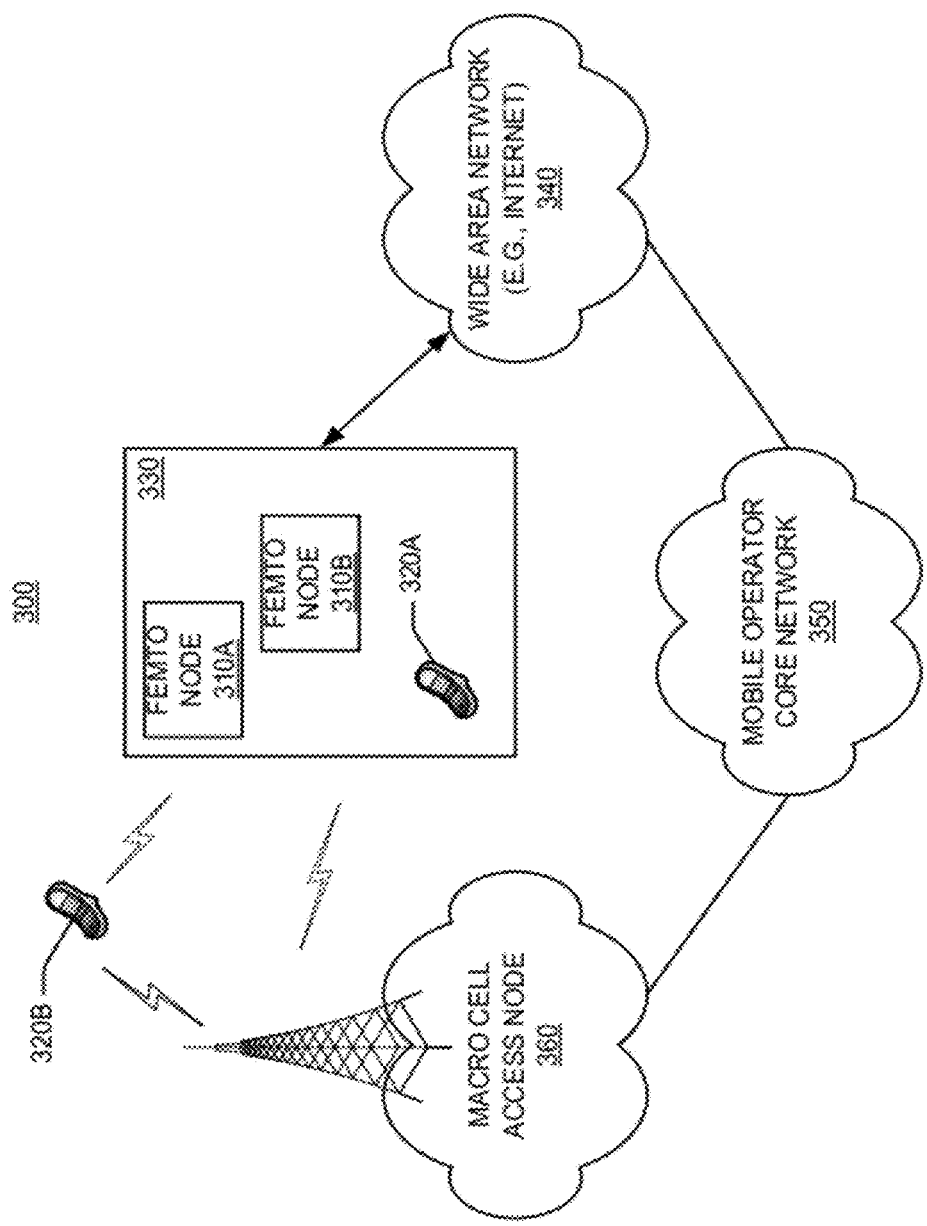
FIG. 3 is an illustration of another example wireless communication system enabling PCI collision detection in synchronous networks in accordance with various aspects set forth herein.

FIG. 3 is an illustration of an example wireless communication system where one or more Femto nodes are deployed enabling PCI collision detection in synchronous networks in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B.

Figure 4:
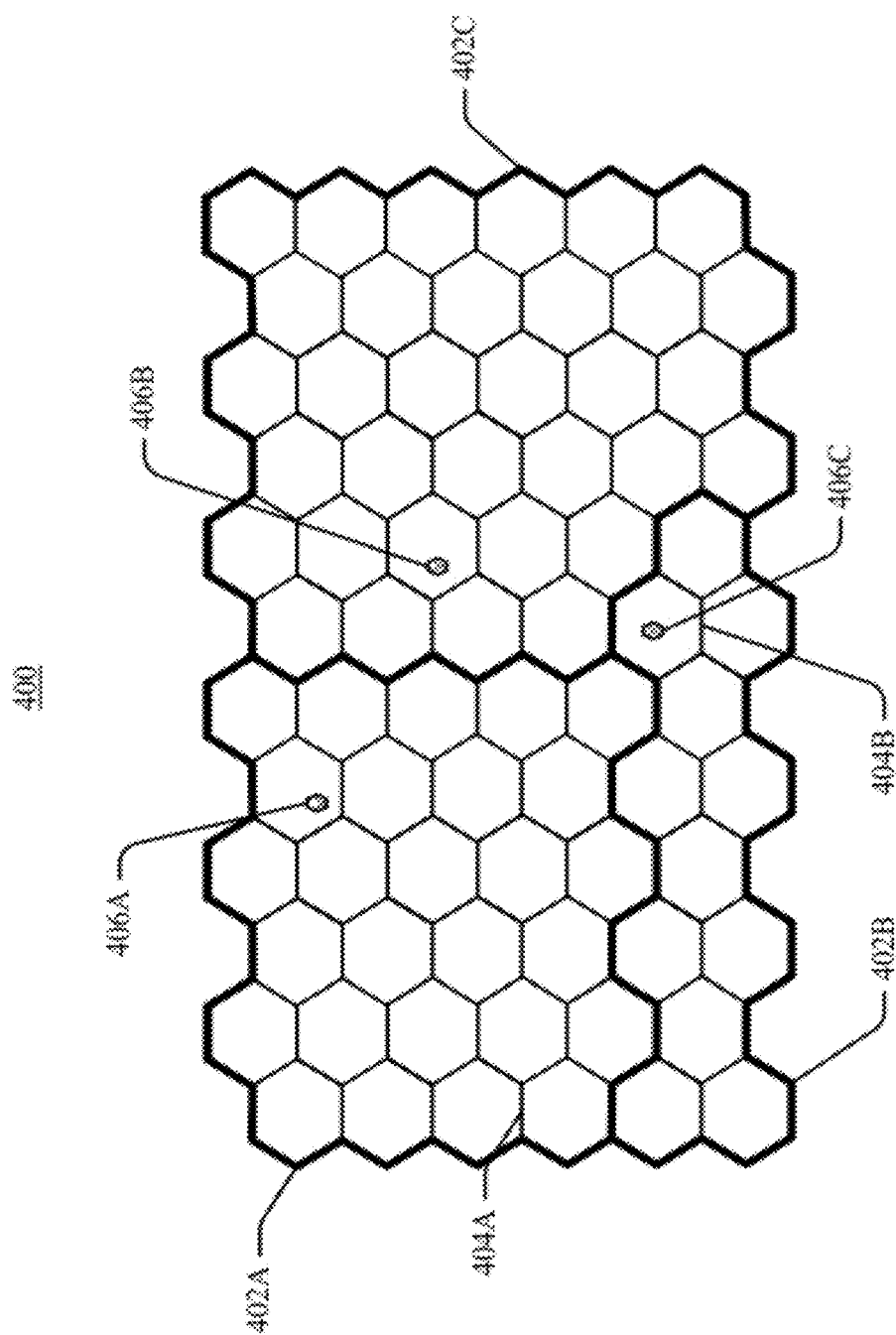
FIG. 4 is an illustration of an example coverage map in a wireless communication system enabling PCI collision detection in synchronous networks in accordance with various aspects set forth herein.

FIG. 4 is an illustration of an example coverage map in a wireless communication system enabling PCI collision detection in synchronous networks in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group (CSG) Home NodeB) is one that provides service to a restricted provisioned set of UEs. This set may be temporarily or permanently extended as necessary. In some aspects, a CSG may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

Figure 5:
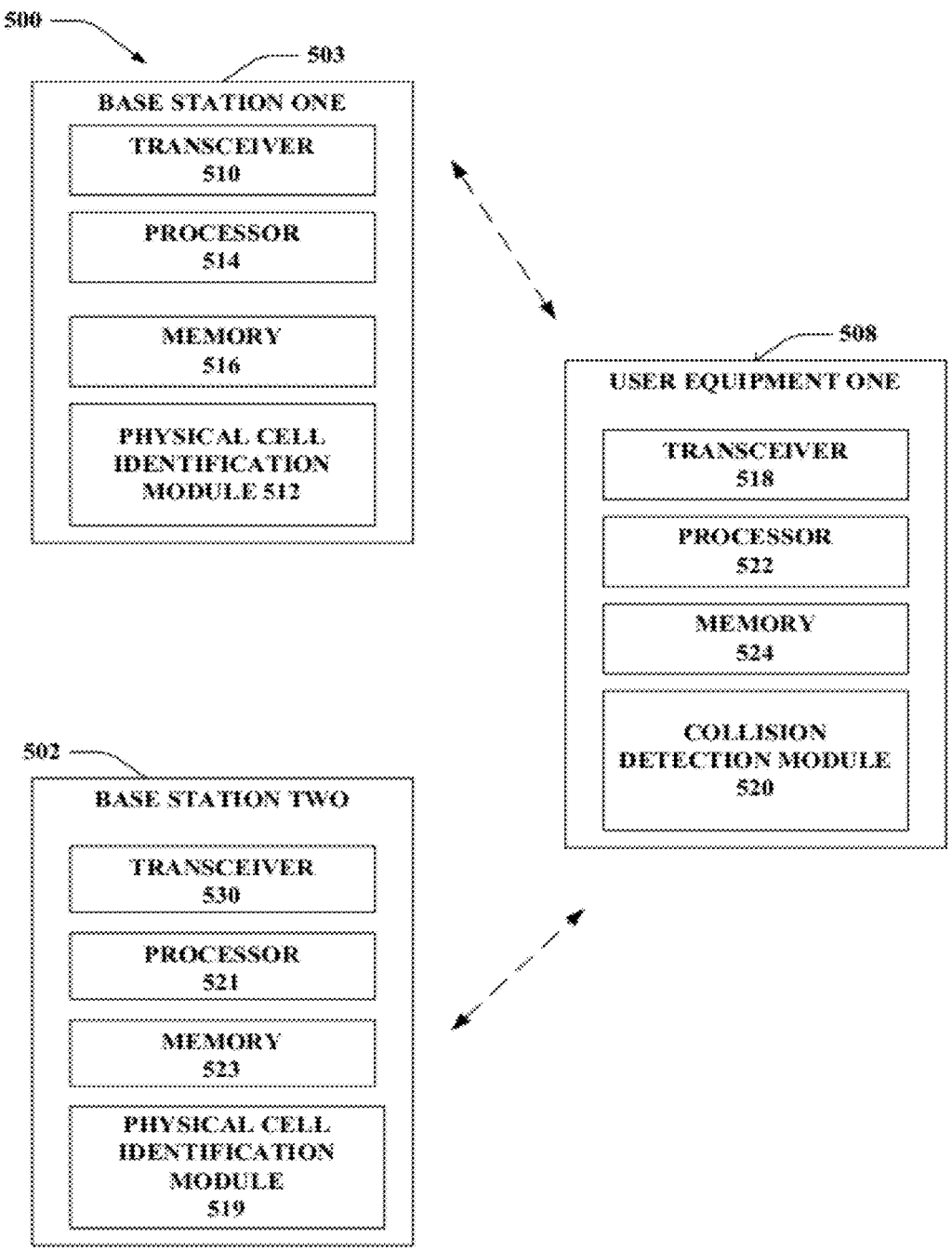
FIG. 5 is an illustration of an example block diagram of a wireless communication system for enabling PCI collision detection in accordance with various aspects set forth herein.

FIG. 5 is an illustration of an example block diagram of a wireless communication system for enabling PCI collision detection in accordance with various aspects set forth herein.

The system 500 can include one or more BSs 502, 503 in respective cells of system 500. In some embodiments, BSs 502, 503 can be configured to provide communication to and from a UE 508 in the geographic proximity of BSs 502, 503. For example, BSs 502, 503 can be configured to report identifying information to the UE 508 for handover and other processing. The identifying information can be generated and transmitted from the PCI modules 512, 519 of BSs 503, 502. The BSs 502, 503 can also include processors 514, 521, memory 516, 523 storing computer-executable instructions and transceivers 510, 530 for performing the functions described herein.

The UE 508 can include a collision detection module 520 for receiving the identifying information and detecting a collision between BS 502, 503. The UE 508 can also include a processor 522, a memory 524 storing computer-executable instructions, and a transceiver 518 for performing the functions described herein.

The identifying information can be a randomly-generated bit or a hash of a Global Cell ID (GCI) indicative of the identification of the respective BS. The identifying information can be reported to the collision detection module 520 of the UE for enabling the UE to detect collision of BS 502 and BS 503. The identifying information can be transmitted as an Enhanced Idle Period on a Down Link (E-IPDL) reference signal and/or in the primary broadcast channel (PBCH) in various embodiments. While the E-IPDL reference signal may be noted in various embodiments discussed herein, in some embodiments, at least one of: the E-IPDL reference signal, positioning reference signal or other reference or positioning signal can be employed for transmitting the identifying information.

The collision detection module 520 can be configured to determine whether a collision has occurred based, at least, upon the value of the identifying information received at the UE 508 from BSs 502, 503 and the time at which the identifying information is received.

In some embodiments, the BSs 502, 503 transmit identifying information that is received by the UE 508. When the UE collision detection module 520 receives two different values of identifying information, it can determine whether the different values were transmitted at the same time (or, in some embodiments, during overlapping time intervals). Upon determining that the different identifying information was transmitted during the same time or the same time interval, the UE 508 determines that a collision has occurred between BS 502, 503. The UE 508 can report the observed values, and/or identifying information on the UL. One or more of the BSs 502, 503 will then receive the report and determine that there is a collision. The BSs 502, 503 can then perform methods to resolve the collision. The methods include, but are not limited to, PCI re-configuration through backhaul message exchange.

The following embodiments describe methods for transmitting the identifying information from the BSs 502, 503 to the UE 508.

Figure 6:
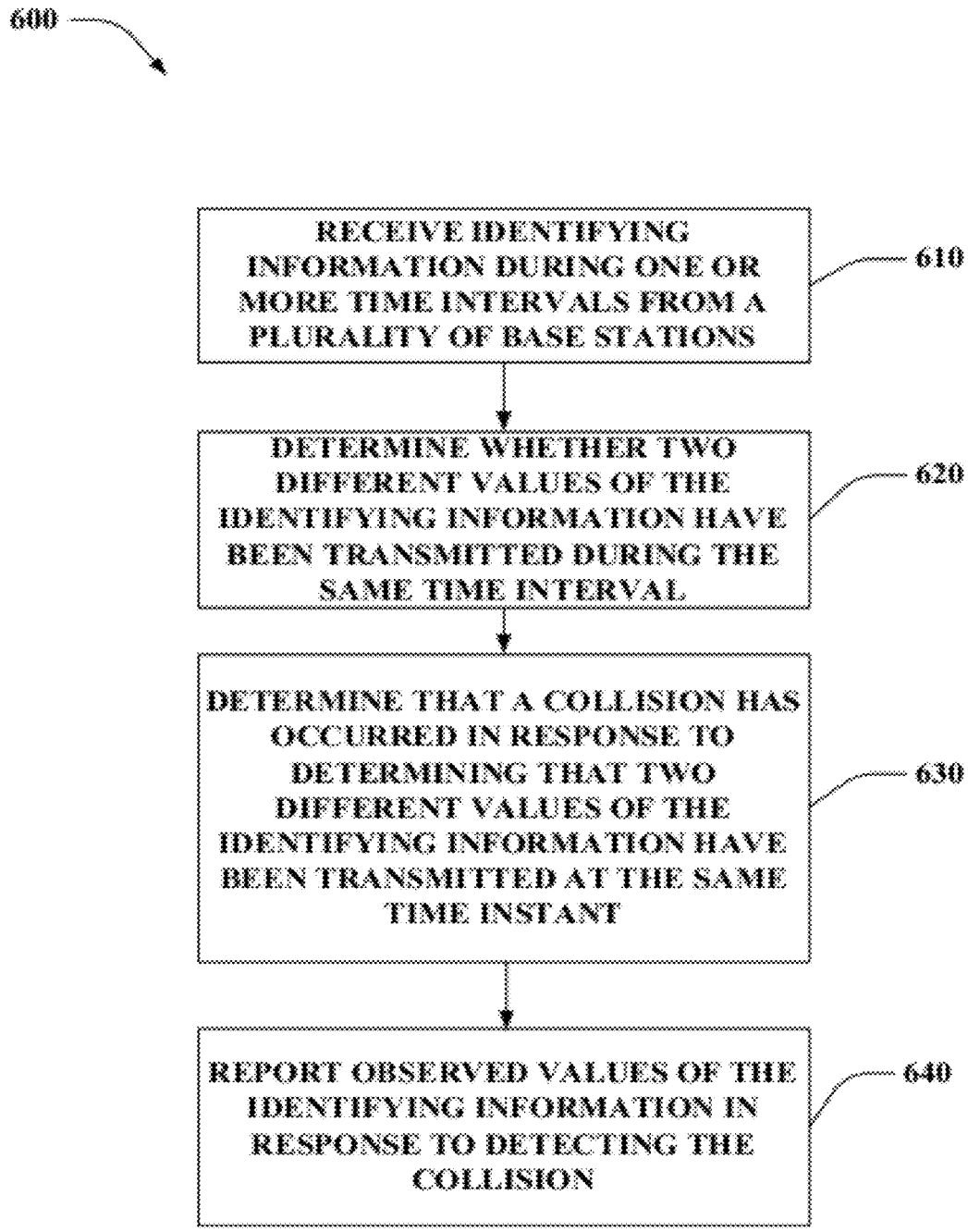
FIGS. 6, 7, 8 and 9 are flowcharts illustrating methods for enabling collision detection in accordance with embodiments described herein.

FIG. 6 is a flowchart illustrating a method for enabling collision detection in accordance with an embodiment described herein. At 610, method 600 can include receiving identifying information during one or more time intervals from a plurality of BSs. At 620, method 600 can include determining whether two different values of the identifying information have been transmitted during the same or overlapping time intervals (or time instances). At 630, method 600 can include determining that a collision has occurred in response to determining that two different values of the identifying information have been transmitted during the same or overlapping time intervals (or time instances).

At 640, method 600 can include reporting detection of a collision. In some embodiments, the report can include observed values of the identifying information.

Figure 7:
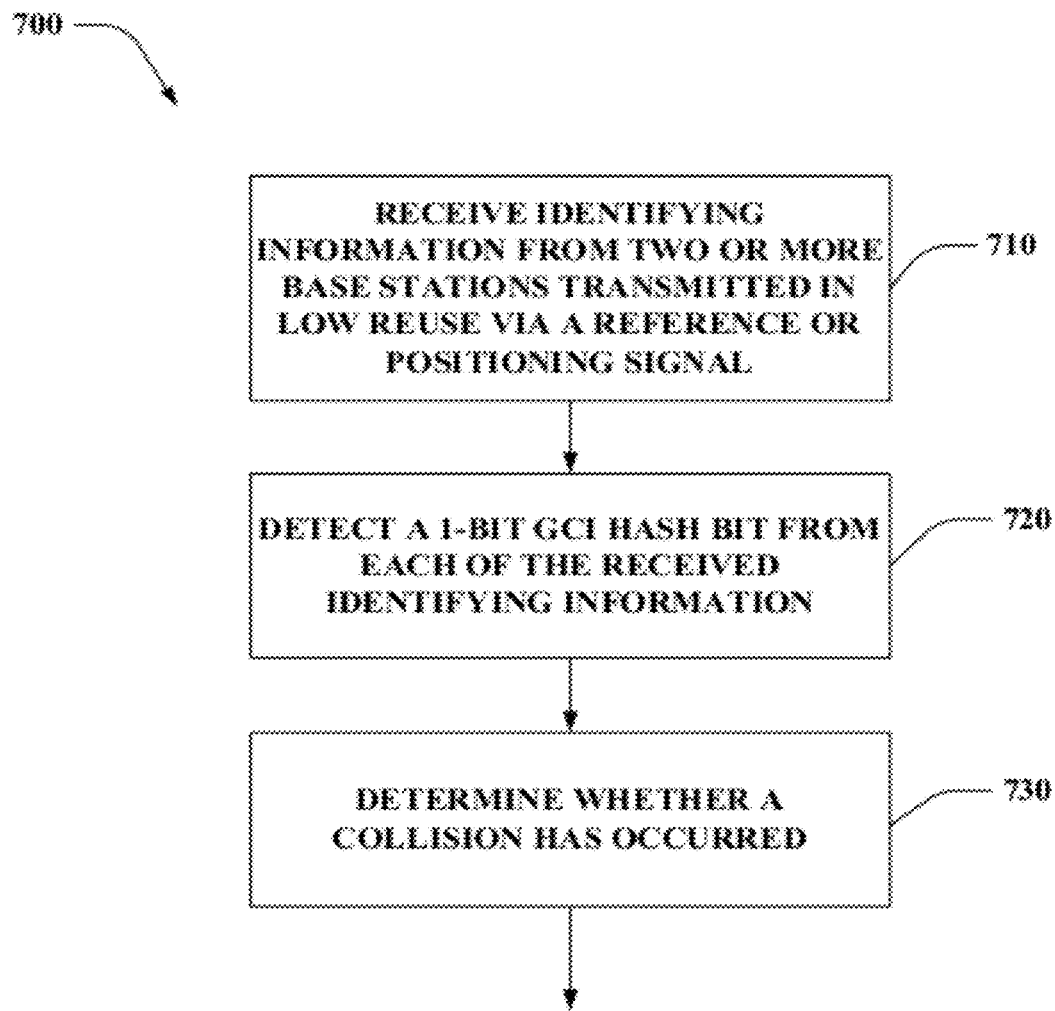

FIG. 7 is a flowchart illustrating a method for enabling collision detection in accordance with an embodiment described herein. At 710, method 700 can include the UE receive identifying information transmitted via the E-IPDL reference signal, a positioning reference signal or other reference or positioning signal. The identifying information can be transmitted from one or more BSs in the cells in geographic proximity to the UE. The E-IPDL reference signal, a positioning reference signal or other reference or positioning signal can be transmitted from the one or more BSs in low reuse in time and frequency.

The E-IPDL reference signal can include a 9-bit PCI. The frequency offset and sequence of information of the E-IPDL reference signal can have a one-to-one mapping with the PCI. In some embodiments, E-IPDL reference signal can have a one-to-one mapping with the PCI and a 1-bit GCI hash bit. The 1-bit GCI hash can be identifying information for, or be included with, identifying the BS to the UE during collision detection. In some embodiments, the 1-bit GCI hash can be signaled using two different frequency offsets of the E-IPDL reference signal.

At 720, method 700 can include the UE detecting a 1-bit GCI hash bit from the identifying information. Accordingly, a 1-bit GCI hash bit can be detected from each of the one or more BSs transmitting identifying information.

In some embodiments, the identifying information can include a randomly-generated bit. The randomly-generated bit can be generated from a pseudorandom noise generator by each of the one or more BSs.

At 730, method 700 can include the UE determining whether a collision has occurred between one or more of the BSs transmitting the identifying information.

Figure 8:
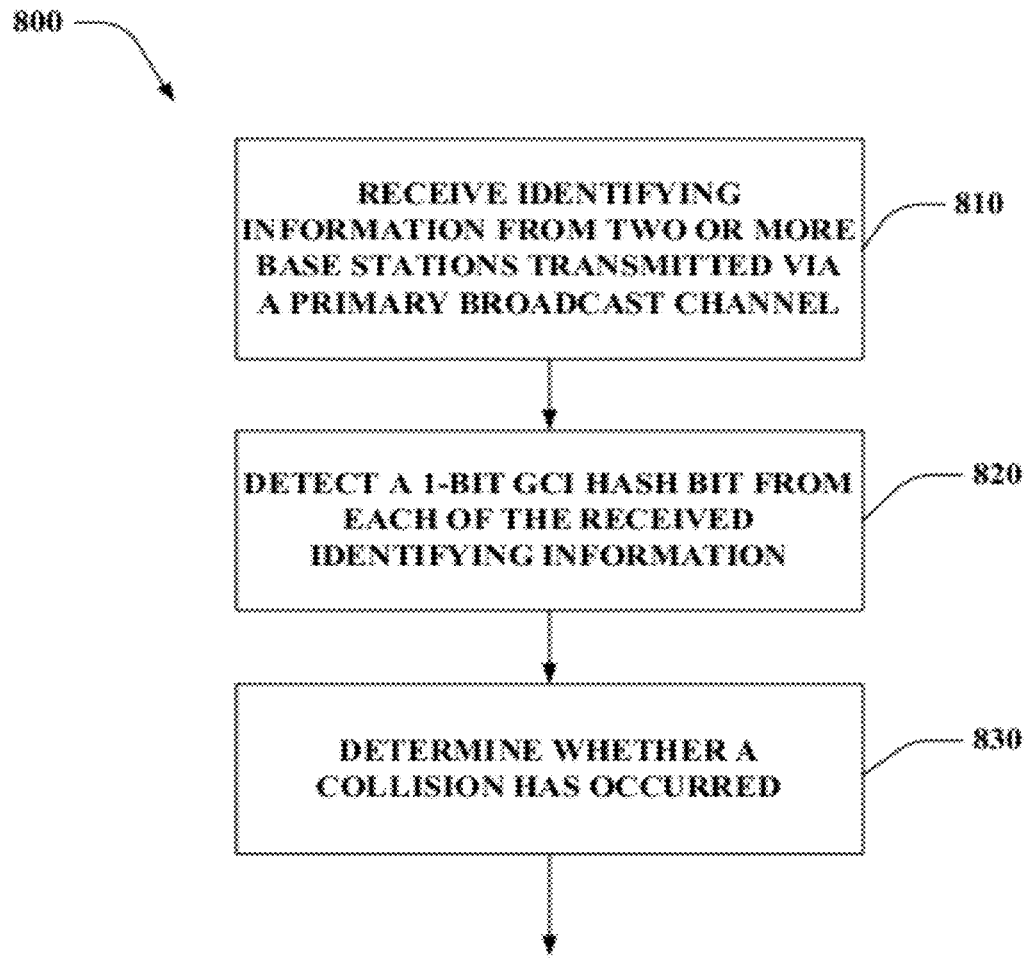

FIG. 8 is a flowchart illustrating a method for enabling collision detection in accordance with an embodiment described herein. At 810, method 800 can include receiving identifying information with large processing gain via a PBCH from a BS to a UE. The PBCH can include spare bits for which at least one bit can be utilized to transmit identifying information for a BS to a UE that detects collision. The identifying information can be or include a 1-bit GCI hash bit in some embodiments. In some embodiments, the identifying information can be or include a randomly-generated bit. The randomly-generated bit can be generated by a pseudorandom noise generator at the BS.

In some embodiments, the PBCH includes 10 spare bits. In addition to the 1-bit GCI hash bit, the PBCH can be utilized to transmit the system bandwidth in 4 bits, the system frame in 8 bits and the physical hybrid automatic repeat request indicator channel (PHICH) load in 3 bits. The system bandwidth and system frame number can be the same for all cells in a synchronous network while the PHICH load and the 1-bit GCI hash bit can be detected if the PBCH is known through reception of any of the BSs transmitting the PBCH.

At 820, method 800 can include the UE performing detection from the identifying information. The PHICH load and the 1-bit GCI hash bit can be detected via blind searching in some embodiments. Specifically, a transceiver at the UE can include a low complexity receiver and the recursive cyclic redundancy check (CRC) and tail biting convolutional coding can reduce the correlation between sequences in the PBCH differing in the 1-bit GCI hash bit. To perform this method with low complexity, it is assumed that the remaining spare bits in the PBCH, after the allocation of the 1-bit GCI hash bit, are the same across the cells. Accordingly, a 1-bit GCI hash bit can be detected from each of the one or more BSs transmitting identifying information.

In some embodiments, the identifying information can include a randomly-generated bit. The randomly-generated bit can be generated from a pseudorandom noise generator by each of the one or more BSs.

At 830, method 800 can include the UE determining whether a collision has occurred between one or more of the BSs transmitting the identifying information.

Figure 9:
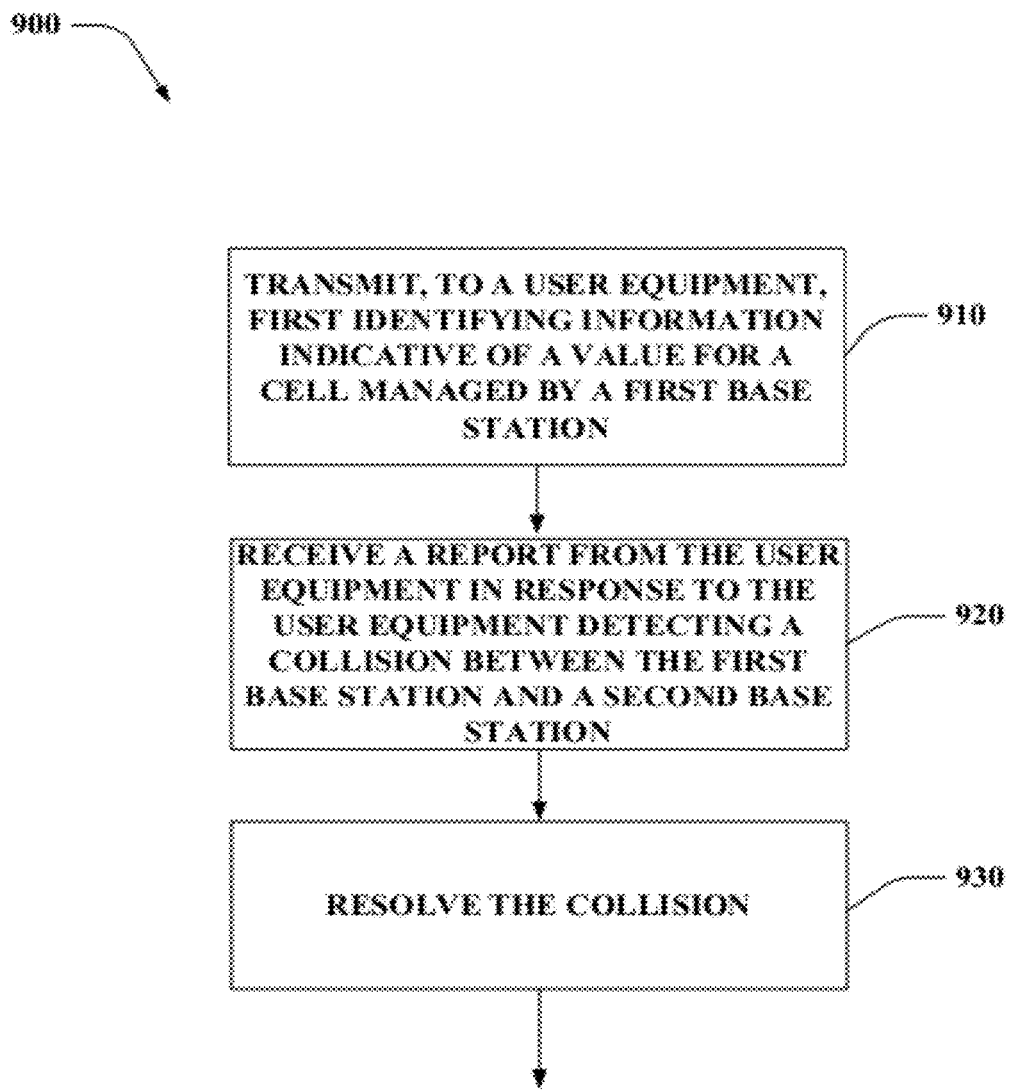

FIG. 9 is another flowchart illustrating a method for enabling collision detection in accordance with an embodiment described herein. At 910, method 900 can include transmitting first identifying information to a UE during one or more time intervals.

In some embodiments, the first identifying information is indicative of a value for a cell managed by a first BS, and the value for a cell managed by a first BS and at least one of the one or more time intervals is employed to determine whether a collision has occurred between a first BS transmitting the first identifying information, and a second BS transmitting second identifying information.

In some embodiments, the first identifying information or the second identifying information is transmitted over an E-IPDL reference signal including a physical cell identifier and at least one of a global cell identifier hash bit or a randomly-generated bit.

In some embodiments, there is a one-to-one mapping with the physical cell identifier and the global cell identifier hash bit. In some embodiments, the E-IPDL reference signal includes the global cell identifier hash bit and the global cell identifier hash bit is signaled using two different frequency offsets of the E-IPDL reference signal.

In some embodiments, the first identifying information or the second identifying information is transmitted over a primary broadcast channel including a plurality of spare bits, and one of the spare bits is a PHICH load, and at least one of a global cell identifier hash bit or a randomly-generated bit.

At 920, method 900 can include receiving a report indicative of a collision from the UE in response to the UE detecting the collision between the first BS and the second BS.

At 930, method 900 can include resolving the collision. In some embodiments, the BS can resolve the collision by performing physical cell identification re-configuration. Physical cell identification re-configuration can be performed over the backhaul.

Figure 10:
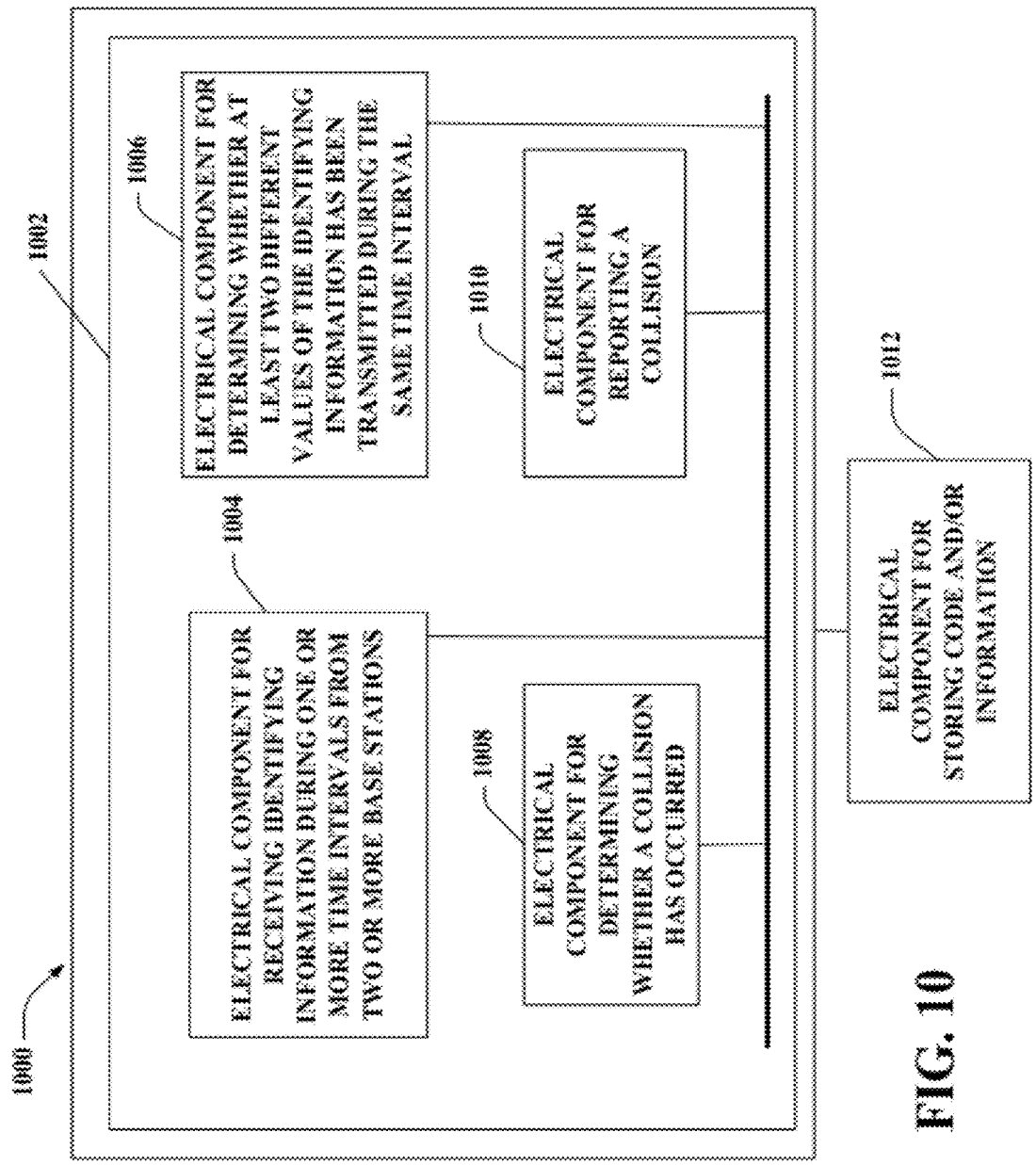
FIGS. 10 and 11 are block diagrams of systems for enabling PCI collision detection in accordance with various aspects set forth herein.
Figure 11:
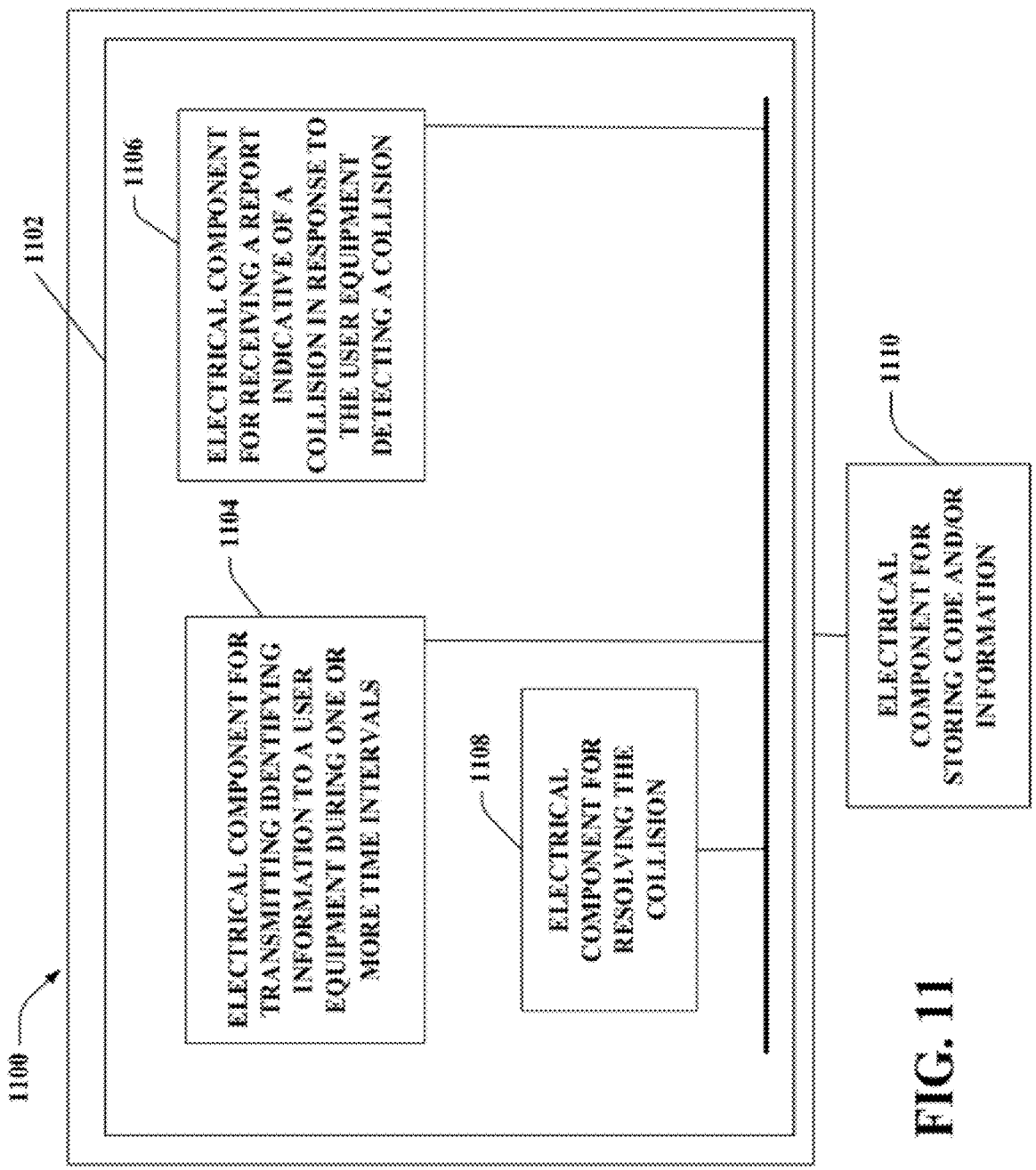

FIGS. 10 and 11 are block diagrams of systems for enabling PCI collision detection in accordance with various aspects set forth herein.

Turning to FIG. 10, illustrated is a system that facilitates collision detection. It is to be appreciated that system 1000 is represented as including functional blocks, which can be functional blocks that represent functions implemented by a processor, hardware, software, firmware, or combination thereof. System 1000 can include a logical grouping 1002 of electrical components that can act in conjunction.

For instance, logical grouping 1002 can include an electrical component 1004 for receiving identifying information during one or more time intervals from a plurality of BSs.

In some embodiments, the identifying information is received from the plurality of BSs over an E-IPDL reference signal. In some embodiments, the E-IPDL reference signal includes a physical cell identifier and at least one of a global cell identifier hash bit or a randomly-generated bit. In some embodiments, the E-IPDL reference signal includes the global cell identifier hash bit and a frequency offset and sequence of information of the E-IPDL reference signal has a one-to-one mapping with the physical cell identifier and the global cell identifier hash bit. In some embodiments, the E-IPDL reference signal includes the global cell identifier hash bit and the global cell identifier hash bit is signaled using two different frequency offsets of the E-IPDL reference signal.

In some embodiments, the identifying information is received from the plurality of BSs over a PBCH. In some embodiments, the PBCH includes a plurality of spare bits, and one of the spare bits can be a global cell identifier hash bit or a randomly-generated bit.

In some embodiments, one of the spare bits is the global cell identifier hash bit and the plurality of spare bits can also include information indicative of a PHICH load. Determining whether at least two different values of the identifying information from the plurality of BSs have been transmitted during the same time interval can include detecting the information indicative of the PHICH load and the GCI hash bit using blind detection.

Further, logical grouping 1002 can include an electrical component 1006 for determining whether at least two different values of the identifying information from the plurality of BSs have been transmitted during the same time interval.

Moreover, logical grouping 1002 can include an electrical component 1008 for determining that a collision has occurred between a plurality of BSs in response to determining that the at least two different values of the identifying information from the plurality of BSs have been transmitted during the same time interval.

Moreover, logical grouping 1002 can include an electrical component 1010 for reporting a detection of the collision. Additionally, the system 1000 can include an electrical component 1012 for storing code and/or information for performing functions associated with system 1000.

Turning to FIG. 11, illustrated is a system that facilitates collision detection. It is to be appreciated that system 1100 is represented as including functional blocks, which can be functional blocks that represent functions implemented by a processor, hardware, software, firmware, or combination thereof. System 1100 can include a logical grouping 1102 of electrical components that can act in conjunction.

For instance, logical grouping 1102 can include an electrical component 1104 for transmitting first identifying information to a UE during one or more time intervals. In some embodiments, the first identifying information is indicative of a value for a cell managed by a first BS. The value for the cell can be employed to determine whether a collision has occurred between the first BS and a second BS station transmitting second identifying information.

In some embodiments, the first identifying information or the second identifying information is transmitted over an Enhanced Idle Period on a Down Link (E-IPDL) reference signal including a physical cell identifier and at least one of a global cell identifier hash bit or a randomly-generated bit. In some embodiments, there is a one-to-one mapping with the physical cell identifier and the global cell identifier hash bit. In some embodiments, the E-IPDL reference signal includes the global cell identifier hash bit and the global cell identifier hash bit is signaled using two different frequency offsets of the E-IPDL reference signal.

In some embodiments, the first identifying information or the second identifying information is transmitted over a primary broadcast channel including a plurality of spare bits, and one of the spare bits is a physical hybrid automatic repeat request indicator channel load and at least one of a global cell identifier hash bit or a randomly-generated bit.

Logical grouping 1102 can include an electrical component 1106 for receiving a report indicative of a collision from the UE in response to the UE detecting the collision between the first BS and the second BS.

Logical grouping 1102 can include an electrical component 1108 for resolving the collision through physical cell identification re-configuration.

Additionally, the system 1100 can include an electrical component 1110 for storing code and/or information for performing functions associated with system 1100.

Figure 12:
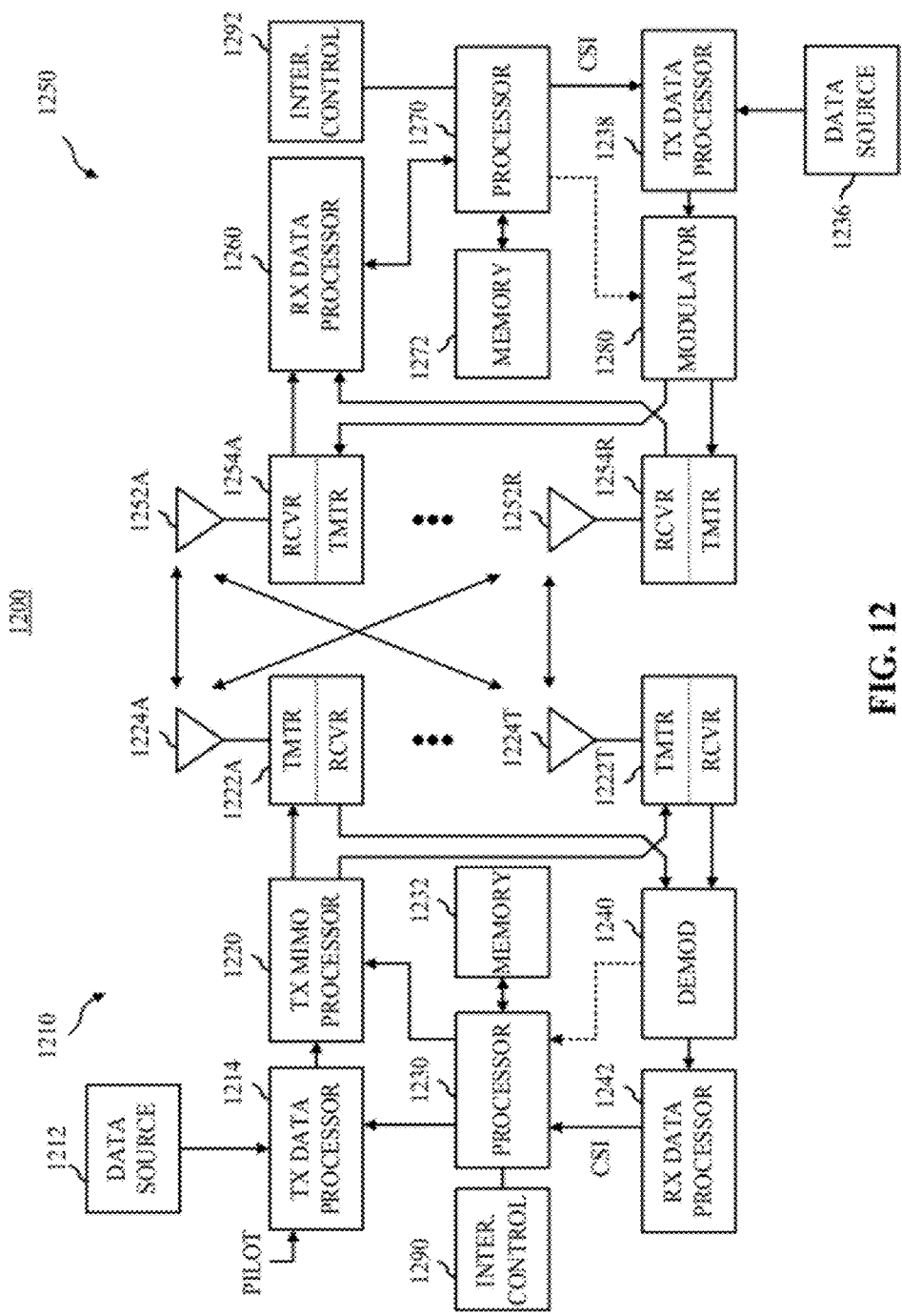
FIG. 12 shows an example wireless communication system in which the embodiments described herein can be employed in accordance with various aspects set forth herein.

FIG. 12 shows an example wireless communication system in which the embodiments described herein can be employed in accordance with various aspects set forth herein. The teachings herein may be incorporated into a node (e.g., a device) employing various components for communicating with at least one other node. FIG. 12 depicts several sample components that may be employed to facilitate communication between nodes. Specifically, FIG. 12 illustrates a BS 1210 (e.g., an access point) and a wireless device 1250 (e.g., an access terminal) of a wireless communication system 1200 (e.g., multiple input multiple output (MIMO) system). At the device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase-shift keying (BPSK), quadrature phase-shift keying (QSPK), m-ary phase-shift keying (M-PSK), or multi-level quadrature amplitude modulation (M-QAM)) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform interference control operations as taught herein. For example, an interference (INTER.) control component 1210 may cooperate with the processor 1230 and/or other components of the device 1210 to send/receive signals to/from another device (e.g., device 1250) as taught herein. Similarly, an interference control component 1292 may cooperate with the processor 1270 and/or other components of the device 1250 to send/receive signals to/from another device (e.g., device 1210). It should be appreciated that for each device 1210 and 1250 the functionality of one or more of the described components may be provided by a single component. For example, a single processing component may provide the functionality of the interference control component 1290 and the processor 1230 and a single processing component may provide the functionality of the interference control component 1292 and the processor 1270.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive multimedia broadcast multicast service (MBMS) (e.g., old MCCH+MSCH). Additionally, the Logical Control Channels can include a Dedicated Control Channel (DCCH), which is a Point-to-point bi-directional channel that transmits dedicated control information and can be used by UEs having a radio resource control (RRC) connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MBMS traffic channel (MTCH) for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating collision detection in a wireless communication system, the method comprising:
   receiving identifying information during one or more time intervals from a plurality of base stations;
   determining whether at least two different values of the identifying information from the plurality of base stations have been transmitted during the same time interval; and
   determining that a collision has occurred between at least two of the plurality of base stations in response to determining that the at least two different values of the identifying information from the plurality of base stations have been transmitted during the same time interval.

2. The method of claim 1, further comprising reporting a detection of the collision.

3. The method of claim 1, wherein the identifying information is received from the plurality of base stations over at least one of: an Enhanced Idle Period on a Down Link (E-IPDL) reference signal, a positioning reference signal or another reference or positioning signal.

4. The method of claim 3, wherein the at least one of the E-IPDL reference signal, positioning reference signal or another reference or positioning signal includes a physical cell identifier, and at least one of a global cell identifier hash bit or a randomly-generated bit.

5. The method of claim 4, wherein the at least one of the E-IPDL reference signal, positioning reference signal or another reference or positioning signal includes the global cell identifier hash bit, and wherein frequency offset and sequence of information of the at least one of the E-IPDL reference signal, positioning reference signal or another reference or positioning signal has a one-to-one mapping with the physical cell identifier and the global cell identifier hash bit.

6. The method of claim 4, wherein the at least one of the E-IPDL reference signal, positioning reference signal or another reference or positioning signal includes the global cell identifier hash bit and the global cell identifier hash bit is signaled using two different frequency offsets of the at least one of the E-IPDL reference signal, positioning reference signal or another reference or positioning signal.

7. The method of claim 1, wherein the identifying information is received from the plurality of base stations over a primary broadcast channel.

8. The method of claim 7, wherein the primary broadcast channel includes a plurality of spare bits, and one of the plurality of spare bits is at least one of a global cell identifier hash bit or a randomly-generated bit.

9. The method of claim 8, wherein the one of the plurality of spare bits is the global cell identifier hash bit and wherein the plurality of spare bits further comprises information indicative of a physical hybrid automatic repeat request indicator channel load, and wherein the determining whether the at least two different values of the identifying information from the plurality of base stations have been transmitted during the same time interval comprises detecting, via blind detection, the information indicative of the physical hybrid automatic repeat request indicator channel load and detecting the global cell identifier hash bit.

10. A computer program product, comprising:
a non-transitory computer-readable medium, comprising:
   a first set of codes for causing a computer to receive identifying information during one or more time intervals from a plurality of base stations;
   a second set of codes for causing the computer to determine whether at least two different values of the identifying information from the plurality of base stations have been transmitted during the same time interval; and
   a third set of codes for causing the computer to determine that a collision has occurred between at least two of the plurality of base stations in response to determining that the at least two different values of the identifying information from the plurality of base stations have been transmitted during the same time interval.

11. The computer program product of claim 10, further comprising a fourth set of codes for causing the computer to report a detection of the collision.

12. The computer program product of claim 10, wherein the identifying information is received from the plurality of base stations over at least one of: an Enhanced Idle Period on a Down Link (E-IPDL) reference signal, positioning reference signal or another reference or positioning signal.

13. The computer program product of claim 12, wherein the at least one of: the E-IPDL reference signal, positioning reference signal or another reference or positioning signal includes a physical cell identifier, and at least one of a global cell identifier hash bit or a randomly-generated bit.

14. The computer program product of claim 13, wherein the at least one of: the E-IPDL reference signal, positioning reference signal or another reference or positioning signal includes the global cell identifier hash bit, and wherein frequency offset and sequence of information of the at least one of: the E-IPDL reference signal, positioning reference signal or another reference or positioning signal has a one-to-one mapping with the physical cell identifier and the global cell identifier hash bit.

15. The computer program product of claim 13, wherein the at least one of: the E-IPDL reference signal, positioning reference signal or another reference or positioning signal includes the global cell identifier hash bit and the global cell identifier hash bit is signaled using two different frequency offsets of the E-IPDL reference signal.

16. The computer program product of claim 10, wherein the identifying information is received from the plurality of base stations over a primary broadcast channel.

17. The computer program product of claim 16, wherein the primary broadcast channel includes a plurality of spare bits, and one of the plurality of spare bits is at least one of a global cell identifier hash bit or a randomly-generated bit.

18. The computer program product of claim 17, wherein the one of the plurality of spare bits is the global cell identifier hash bit and wherein the plurality of spare bits further comprises information indicative of a physical hybrid automatic repeat request indicator channel load, and wherein the determining whether the at least two different values of the identifying information from the plurality of base stations have been transmitted during the same time interval comprises detecting, via blind detection, the information indicative of the physical hybrid automatic repeat request indicator channel load and detecting the global cell identifier hash bit.

19. An apparatus, comprising:
means for receiving identifying information during one or more time intervals from a plurality of base stations;
means for determining whether at least two different values of the identifying information from the plurality of base stations have been transmitted during the same time interval; and
means for determining that a collision has occurred between at least two of the plurality of base stations in response to determining that the at least two different values of the identifying information from the plurality of base stations have been transmitted during the same time interval.

20. The apparatus of claim 19, further comprising means for reporting a detection of the collision.

21. The apparatus of claim 19, wherein the identifying information is received from the plurality of base stations over at least one of: an Enhanced Idle Period on a Down Link (E-IPDL) reference signal, a positioning reference signal or another reference or positioning signal.

22. The apparatus of claim 21, wherein the at least one of: the E-IPDL reference signal, positioning reference signal or another reference or positioning signal includes a physical cell identifier, and at least one of a global cell identifier hash bit or a randomly-generated bit.

23. The apparatus of claim 22, wherein the at least one of: the E-IPDL reference signal, positioning reference signal or another reference or positioning signal includes the global cell identifier hash bit, and wherein frequency offset and sequence of information of the at least one of: the E-IPDL reference signal, positioning reference signal or another reference or positioning signal has a one-to-one mapping with the physical cell identifier and the global cell identifier hash bit.

24. The apparatus of claim 22, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

25. The apparatus of claim 19, wherein the identifying information is received from the plurality of base stations over a primary broadcast channel.

26. The apparatus of claim 25, wherein the primary broadcast channel includes a plurality of spare bits, and one of the plurality of spare bits is at least one of a global cell identifier hash bit or a randomly-generated bit.

27. The apparatus of claim 26, wherein the one of the plurality of spare bits is the global cell identifier hash bit and wherein the plurality of spare bits further comprises information indicative of a physical hybrid automatic repeat request indicator channel load, and wherein the determining whether the at least two different values of the identifying information from the plurality of base stations have been transmitted during the same time interval comprises detecting, via blind detection, the information indicative of the physical hybrid automatic repeat request indicator channel load and detecting the global cell identifier hash bit.

28. An apparatus, comprising:
a collision detection module configured to:
receive identifying information during one or more time intervals from a plurality of base stations;
determine whether at least two different values of the identifying information from the plurality of base stations have been transmitted during the same time interval; and
determine that a collision has occurred between at least two of the plurality of base stations in response to determining that the at least two different values of the identifying information from the plurality of base stations have been transmitted during the same time interval.

29. The apparatus of claim 28, wherein the collision detection module is further configured to report a detection of the collision.

30. The apparatus of claim 28, wherein the identifying information is received from the plurality of base stations over at least one of: an Enhanced Idle Period on a Down Link (E-IPDL) reference signal, a positioning reference signal or another reference or positioning signal.

31. The apparatus of claim 30, wherein the at least one of: the E-IPDL reference signal, positioning reference signal or another reference or positioning signal includes a physical cell identifier and at least one of a global cell identifier hash bit or a randomly-generated bit.

32. The apparatus of claim 31, wherein the at least one of: the E-IPDL reference signal, positioning reference signal or another reference or positioning signal includes the global cell identifier hash bit, and wherein frequency offset and sequence of information of the at least one of: the E-IPDL reference signal, positioning reference signal or another reference or positioning signal has a one-to-one mapping with the physical cell identifier and the global cell identifier hash bit.

33. The apparatus of claim 31, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

34. The apparatus of claim 28, wherein the identifying information is received from the plurality of base stations over a primary broadcast channel.

35. The apparatus of claim 34, wherein the primary broadcast channel includes a plurality of spare bits, and one of the plurality of spare bits is at least one of a global cell identifier hash bit or a randomly-generated bit.

36. The apparatus of claim 35, wherein the one of the plurality of spare bits is the global cell identifier hash bit and wherein the plurality of spare bits further comprises information indicative of a physical hybrid automatic repeat request indicator channel load, and wherein the determining whether the at least two different values of the identifying information from the plurality of base stations have been transmitted during the same time interval comprises detecting, via blind detection, the information indicative of the physical hybrid automatic repeat request indicator channel load and detecting the global cell identifier hash bit.

37. A method for facilitating collision detection in a wireless communication system, the method comprising:
transmitting first identifying information to user equipment during one or more time intervals, wherein the first identifying information to user equipment during one or more time intervals is indicative of a value for a cell managed by a first base station, and wherein the value for a cell managed by a first base station is employed to determine whether a collision has occurred between the first base station and a second base station transmitting second identifying information.

38. The method of claim 37, further comprising receiving a report indicative of a collision from the user equipment in response to the user equipment detecting the collision between the first base station and the second base station transmitting second identifying information.

39. The method of claim 38, further comprising resolving the collision through physical cell identification re-configuration.

40. The method of claim 37, wherein the first identifying information to user equipment during one or more time intervals or second identifying information is transmitted over at least one of: an Enhanced Idle Period on a Down Link (E-IPDL) reference signal, a positioning reference signal or another reference or positioning signal including a physical cell identifier, and at least one of a global cell identifier hash bit or a randomly-generated bit.

41. The method of claim 40, wherein there is a one-to-one mapping with the physical cell identifier and the global cell identifier hash bit.

42. The method of claim 40, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

43. The method of claim 37, wherein the first identifying information to user equipment during one or more time intervals or second identifying information is transmitted over a primary broadcast channel including a plurality of spare bits, and one of the plurality of spare bits is a physical hybrid automatic repeat request indicator channel load, and at least one of a global cell identifier hash bit or a randomly-generated bit.

44. A computer program product, comprising:
a non-transitory computer-readable medium, comprising:
a first set of codes for causing a computer to transmit first identifying information to user equipment during one or more time intervals, wherein the first identifying information to user equipment during one or more time intervals is indicative of a value for a cell managed by a first base station, and wherein the value for a cell managed by a first base station is employed to determine whether a collision has occurred between the first base station and a second base station transmitting second identifying information.

45. The computer program product of claim 44, further comprising a second set of codes for causing the computer to receive a report indicative of a collision from the user equipment in response to the user equipment detecting the collision between the first base station and the second base station transmitting second identifying information.

46. The computer program product of claim 45, further comprising a third set of codes for causing the computer to resolve the collision through physical cell identification re-configuration.

47. The computer program product of claim 44, wherein the first identifying information to user equipment during one or more time intervals or second identifying information is transmitted over at least one of: the E-IPDL reference signal, positioning reference signal or another reference or positioning signal including a physical cell identifier, and at least one of a global cell identifier hash bit or a randomly-generated bit.

48. The computer program product of claim 47, wherein there is a one-to-one mapping with the physical cell identifier and the global cell identifier hash bit.

49. The computer program product of claim 47, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

50. The computer program product of claim 44, wherein the first identifying information to user equipment during one or more time intervals or second identifying information is transmitted over a primary broadcast channel including a plurality of spare bits, and one of the plurality of spare bits is a physical hybrid automatic repeat request indicator channel load, and at least one of a global cell identifier hash bit or a randomly-generated bit.

51. An apparatus comprising:
means for transmitting first identifying information to user equipment during one or more time intervals, wherein the first identifying information to user equipment during one or more time intervals is indicative of a value for a cell managed by a first base station, and wherein the value for a cell managed by a first base station is employed to determine whether a collision has occurred between the first base station and a second base station transmitting second identifying information.

52. The apparatus of claim 51, further comprising means for receiving a report indicative of a collision from the user equipment in response to the user equipment detecting the collision between the first base station and the second base station transmitting second identifying information.

53. The apparatus of claim 52, further comprising means for resolving the collision through physical cell identification re-configuration.

54. The apparatus of claim 51, wherein the first identifying information to user equipment during one or more time intervals or second identifying information is transmitted over at least one of: an Enhanced Idle Period on a Down Link (E-IPDL) reference signal, a positioning reference signal or another reference or positioning signal including a physical cell identifier, and at least one of a global cell identifier hash bit or a randomly-generated bit.

55. The apparatus of claim 54, wherein there is a one-to-one mapping with the physical cell identifier and the global cell identifier hash bit.

56. The apparatus of claim 54, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

57. The apparatus of claim 51, wherein the first identifying information to user equipment during one or more time intervals or second identifying information is transmitted over a primary broadcast channel including a plurality of spare bits, and one of the plurality of spare bits is a physical hybrid automatic repeat request indicator channel load, and at least one of a global cell identifier hash bit or a randomly-generated bit.

58. An apparatus comprising:
a physical cell identification module configured to:
transmit first identifying information to user equipment during one or more time intervals, wherein the first identifying information to user equipment during one or more time intervals is indicative of a value for a cell managed by a first base station, and wherein the value for a cell managed by a first base station is employed to determine whether a collision has occurred between the first base station and a second base station transmitting second identifying information.

59. The apparatus of claim 58, wherein the physical cell identification module is further configured to receive a report indicative of a collision from the user equipment in response to the user equipment detecting the collision between the first base station and the second base station transmitting second identifying information.

60. The apparatus of claim 59, wherein the physical cell identification module is further configured to resolve the collision through physical cell identification re-configuration.

61. The apparatus of claim 58, wherein the first identifying information to user equipment during one or more time intervals or second identifying information is transmitted over the at least one of: an Enhanced Idle Period on a Down Link (E-IPDL) reference signal, positioning reference signal or another reference or positioning signal including a physical cell identifier, and at least one of a global cell identifier hash bit or a randomly-generated bit.

62. The apparatus of claim 61, wherein there is a one-to-one mapping with the physical cell identifier and the global cell identifier hash bit.

63. The apparatus of claim 61, wherein the at least one of: the E-IPDL reference signal, positioning reference signal or another reference or positioning signal includes the global cell identifier hash bit and the global cell identifier hash bit is signaled using two different frequency offsets of the at least one of: the E-IPDL reference signal, positioning reference signal or another reference or positioning signal.

64. The apparatus of claim 58, wherein the first identifying information to user equipment during one or more time intervals or second identifying information is transmitted over a primary broadcast channel including a plurality of spare bits, and one of the plurality of spare bits is a physical hybrid automatic repeat request indicator channel load, and at least one of a global cell identifier hash bit or a randomly-generated bit.

* * * * *